(12) United States Patent
Yokomizo et al.

(10) Patent No.: US 6,611,077 B2
(45) Date of Patent: Aug. 26, 2003

(54) MOTOR HAVING A COMMUTATOR

(75) Inventors: Minoru Yokomizo, Tokyo (JP);
Shinobu Nishimura, Tokyo (JP)

(73) Assignees: Canon Seiki Kabushiki Kaisha, Tokyo (JP); Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/829,914

(22) Filed: Apr. 11, 2001

(65) Prior Publication Data
US 2001/0048263 A1 Dec. 6, 2001

(30) Foreign Application Priority Data
Apr. 13, 2000 (JP) .......................... 2000-111685

(51) Int. Cl.[7] .................. H02K 23/00; H02K 13/00; H01R 39/04
(52) U.S. Cl. .................. 310/221; 310/233; 310/234; 310/236

(58) Field of Search ................... 310/233, 234, 310/71, 220, 221, 68 R, 236

(56) References Cited
U.S. PATENT DOCUMENTS

| 4,833,357 A | * | 5/1989 | Tamura et al. | 310/221 |
| 5,272,404 A | * | 12/1993 | Yuhi et al. | 310/233 |
| 5,895,990 A | * | 4/1999 | Lau | 310/220 |
| 6,285,106 B1 | * | 9/2001 | Oki | 310/220 |

* cited by examiner

Primary Examiner—Burton S. Mullins
(74) Attorney, Agent, or Firm—Fitzpatrick, Cella, Harper & Scinto

(57) ABSTRACT

A motor is provided with a riser member having a base portion fixed to the surface of the commutator of a rotor, a first turned-back portion bent so as to hook the winding of the motor, and a second turned-back portion provided on the side opposite to the base portion with respect to the first turned-back portion. Thereby, a ring varistor can be supported by the second turned-back portion, and the mounting of the ring varistor can be effected easily.

4 Claims, 4 Drawing Sheets

MOTOR HAVING A COMMUTATOR

BACKGROUND OF THE INVENTION

1. Field of the Invention

This invention relates to a motor having a commutator on which a ring varistor is mountable.

2. Related Background Art

The rotor of a motor provided with a commutator simply comprises a construction shown in FIG. 8 the accompanying drawings, i.e., an armature core 11 having a plurality of slots connected to the rotary shaft 6 of the rotor, a commutator 5 fixed coaxially with the rotary shaft 6 and comprising the same number of commutator pieces as the slots of the armature core 11, and a winding 10 for effecting connection between the commutator pieces and the slots of the armature core 11. FIGS. 4, 5 and 6 of the accompanying drawings show the vicinity of the commutator 5 of a motor having a commutator according to the prior art on an enlarged scale. The base portion of riser members 1 is fixed to the surface of the commutator 5 concentrically fixed to the rotary shaft 6 of the rotor of the motor. As a method of conducting a winding 4 to the riser members 1, there is fusing. This, as shown in FIG. 5, is a method of hooking the winding 4 on the end portion 2 of the riser members 1 which is not the base portions thereof, and thereafter bringing the riser members into close contact with each other at a position 3 and applying a high voltage thereto the thereby weld the close contact portion. Since a high voltage is used, the cover of the winding can be removed at the same time by the heat at this time and this is excellent in efficiency as compared with the step of removing the cover of the winding 4 by the used of soldering iron or the like.

FIG. 7 of the accompanying drawings shows the internal circuit of the motor. The commutator 5 comprises a plurality of commutator pieces 50, and the plurality of commutator pieces 50 are rotated to thereby effect the switching action, but during this switching, a counter-electromotive voltage is produced. This counter-electromotive voltage sometimes reaches several tens of thousands of volts, and in order to prevent an excessive electric current from flowing through the motor by this voltage, a ring varistor 7 is joined to the riser members 1 of the commutator 5. FIG. 6 shows the joined portions of the varistor 7 on an enlarged scale. As a method of joining the ring varistor 7, it has been practiced to effect fusing on the riser members, and thereafter insert the commutator and the riser members into the inner diameter portion of the ring varistor 7, fixing the ring varistor 7 in its floating state by a jig or the like, and join the ring varistor to the riser members 1 by soldering. In this structure, however, the riser members 1 and the ring varistor 7 are not in direct contact with each other, and conduction is effected through a soldered portion 8. Consequently, if malconduction is caused in the soldered portion 8, there has been the possibility of bad conduction occurring between the riser members 1 and the ring varistor 7. Accordingly, in order to prevent the influence of the counter-electromotive force and to have the motor not damaged, room for improvement is considered to be left in the method of joining the ring varistor to the riser member 1. Also, in the above-described conventional joining method, it is necessary to fix the not so large ring varistor 7 in its floating state, and this has not been good in working efficiency. Further, when the region of the ring varistor 7 which is to be soldered is predetermined, the circumferential positioning of the ring varistor 7 must be done accurately, and it has not been easy to effect this positioning on the ring varistor 7 in its floating state.

SUMMARY OF THE INVENTION

One aspect of this invention is to provide a riser member having a base portion fixed to the surface of the commutator of a rotor, a first turned-back portion bent so as to hook the winding of a motor, and a second turned-back portion provided on the side opposite to the base portion with respect to the first turned-back portion, to thereby enable a ring varistor to be supported by the second turned-back portion, and enable the mounting of the ring varistor to be effected easily. Further, when the ring varistor has been mounted, the second turned-back portion is in direct contact with the ring varistor and therefore, bad conduction attributable to soldering can be prevented.

DESCRIPTION OF THE PREFERRED EMBODIMENTS

Figure 1:
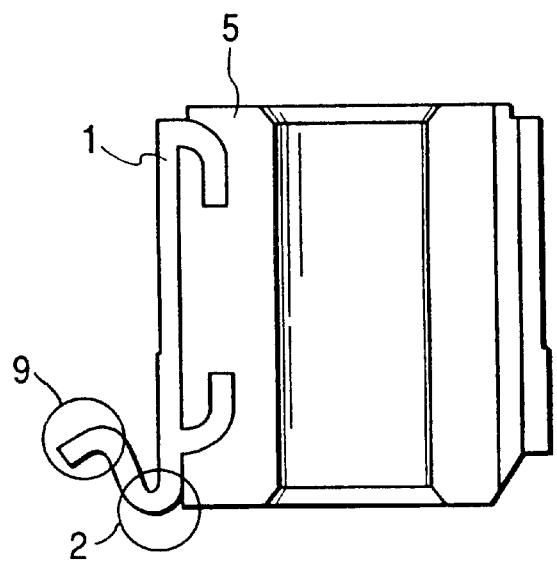
FIG. 1 is an enlarged view of a commutator before the fusing of the present invention is effected.
Figure 2:
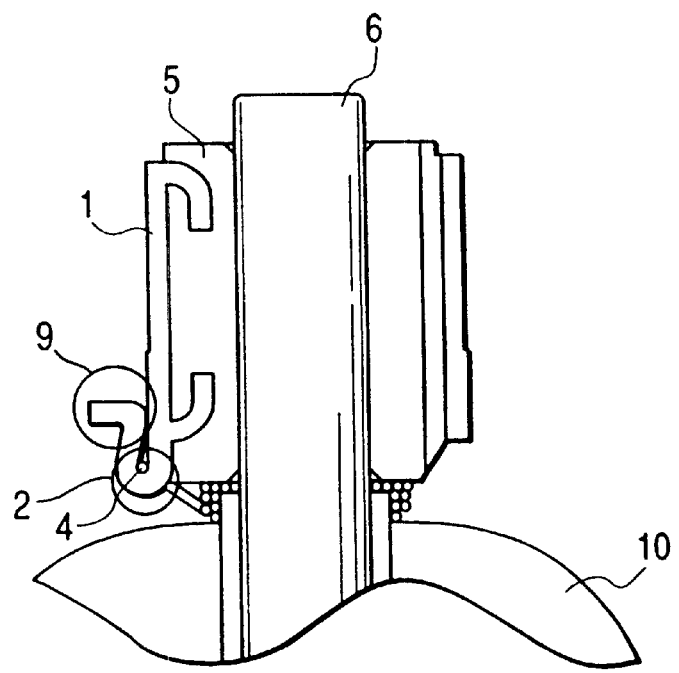
FIG. 2 is an enlarged view of the commutator after the fusing of the present invention.
Figure 3:
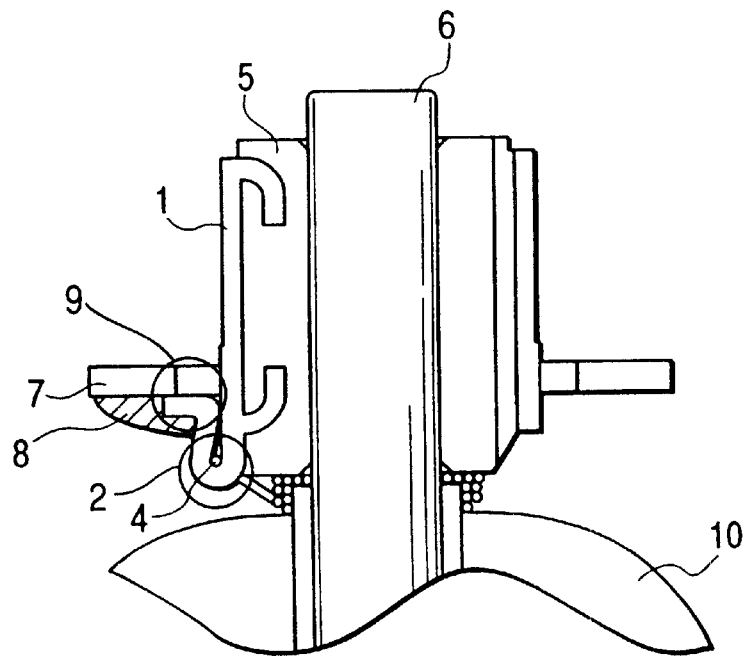
FIG. 3 is an enlarged view of the commutator on which the ring varistor of the present invention has been mounted.
Figure 4:
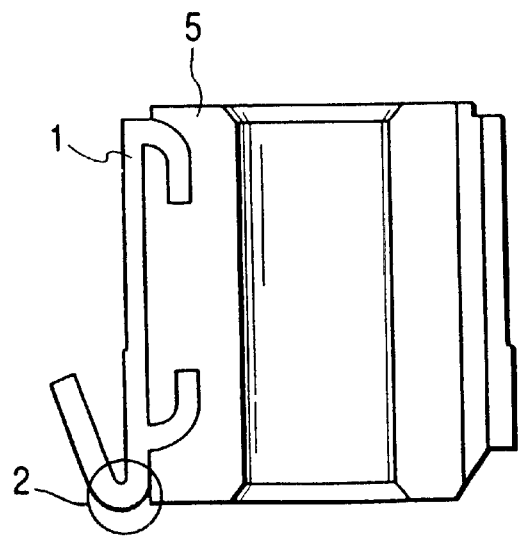
FIG. 4 is an enlarged view of a commutator before the fusing according to the prior art is effected.
Figure 5:
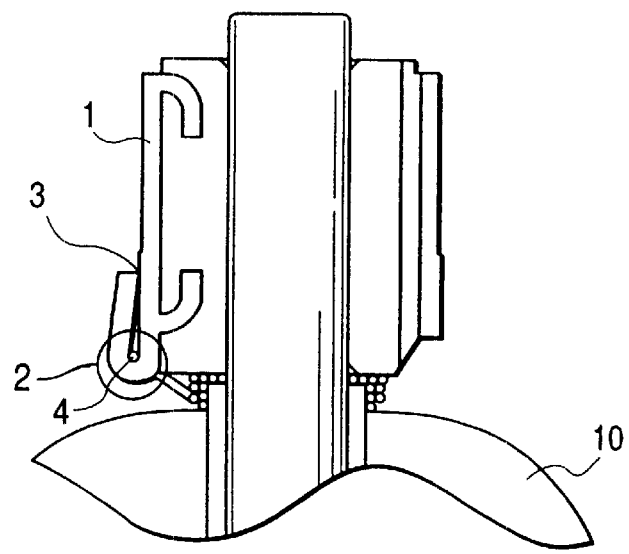
FIG. 5 is an enlarged view of the commutator after the fusing according to the prior art.
Figure 6:
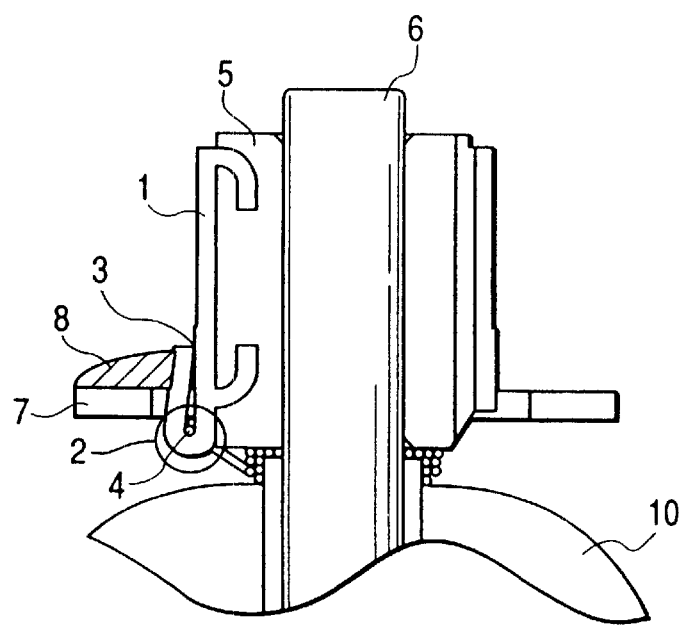
FIG. 6 is an enlarged view of the commutator on which a ring varistor according to the prior art has been mounted.
Figure 7:
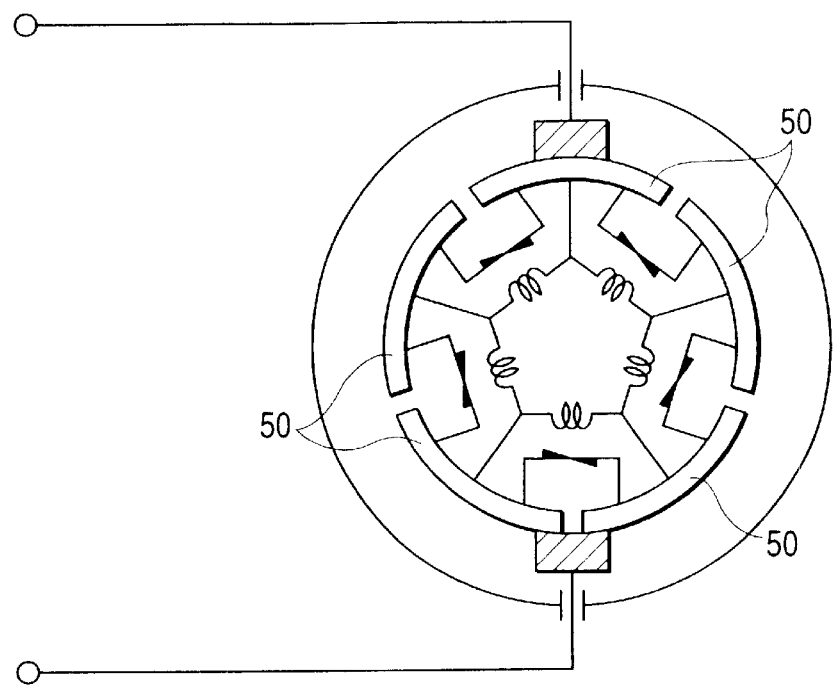
FIG. 7 shows the internal circuit of a motor.
Figure 8:
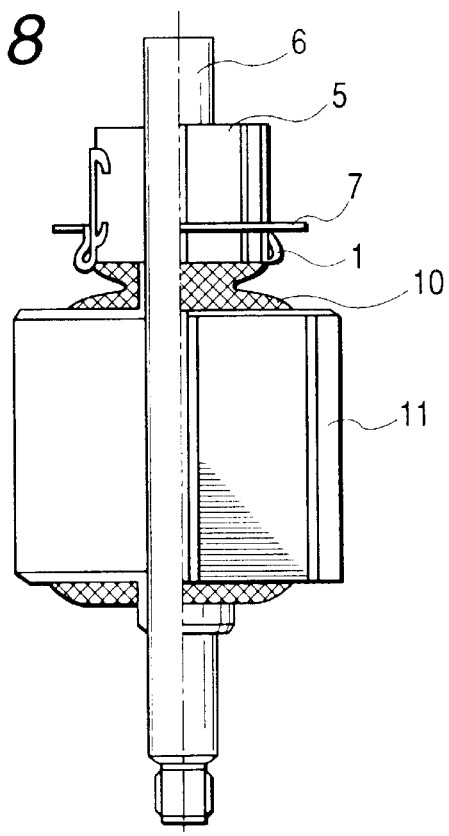
FIG. 8 shows the appearances of a rotor.

FIGS. 1, 2 and 3 show an embodiment of the present invention.

FIG. 1 shows the vicinity of a commutator 5 before fusing is effected on an enlarged scale. The vicinity 2 of the base end portion of a riser member is bent toward the outside of the commutator 5 so as to be capable of hooking a winding 4 and further, the end portion 9 of the riser member which is not the base portion thereof is bent in a direction opposite the region on which the winding is hooked. By the use of this riser member 1, fusing is effected as in the prior art. That is, the winding 4 is hooked on the vicinity 2 of the base end portion of the riser member, whereafter fusing is effected so that the vicinity of a location at which the end portion 9 of the riser member is bent may closely contact with the base portion. By doing so, as shown in FIG. 2, the end portion 9 of the riser member after fusing faces the outside of the diametral direction of the commutator 5. The end portion 9 of the riser member at this time faces a direction substantially perpendicular to the base portion, and if this riser member 1 is used, the end portion 9 of the riser member is positioned outside of the inner diameter a ring varistor 7, and it becomes possible to place the ring varistor 7 on the end portion 9 of the riser member. The riser member 1 is uniformly provided along the circumferential direction of the commutator 5 and therefore, the ring varistor 7 is also uniformly supported in the circumferential direction of the commutator 5 by the riser member 1. If in this state, the joining of the riser member 1 and the ring varistor 7 by soldering is effected, the positioning of the ring varistor 7 becomes easy and reliable by a supporting portion which is the end portion 9 of the riser member, and the fixiing thereof becomes easy and working efficiency is improved. Also, since the riser member 1 and the ring varistor 7 are in direct contact with each other, bad conduction between the riser member 1 and the ring varistor 7 attributable to the bad contact of the soldered portion 8 does not occur and thus, it becomes possible to provide a motor having the commutator 5 excellent in safety.

What is claimed is:

1. A riser member of a motor, said motor having said riser member in which a commutator piece is electrically connected to a winding of an armature core, and a varistor joined to said riser member so as to prevent an excessive electrical current from flowing in said motor, said riser member comprising:

an end of said riser member bent toward an exterior of said commutator;

a base portion fixed to a surface of said commutator, wherein a winding is provided between a base portion of said riser member and the end of said riser member, the bent portion of the end of said riser member closely contacting, by fusion, with the base portion of said riser member and joining said varistor to the end of said riser member.

2. A riser member of a motor according to claim 1, wherein the end of said riser member is bent so that the end of said riser member is oriented in a substantially vertical direction to the base portion.

3. A motor having the riser member of claim 1.

4. A motor according to claim 3, wherein the end of said riser member is bent so that the end of said riser member is oriented in a substantially vertical direction to the base portion.

* * * * *

UNITED STATES PATENT AND TRADEMARK OFFICE
CERTIFICATE OF CORRECTION

PATENT NO. : 6,611,077 B2
DATED : August 26, 2003
INVENTOR(S) : Minoru Yokomizo et al.

It is certified that error appears in the above-identified patent and that said Letters Patent is hereby corrected as shown below:

<u>Column 1,</u>
Line 28, "the" should read -- to --.
Line 32, "used" should read -- use --.

Signed and Sealed this

Thirteenth Day of January, 2004

JON W. DUDAS
*Acting Director of the United States Patent and Trademark Office*